US011556780B2

(12) United States Patent
Ishii (10) Patent No.: US 11,556,780 B2
(45) Date of Patent: Jan. 17, 2023

(54) NEURAL NETWORK LEARNING DEVICE, NEURAL NETWORK LEARNING METHOD, AND RECORDING MEDIUM ON WHICH NEURAL NETWORK LEARNING PROGRAM IS STORED

(71) Applicant: NEC Corporation, Tokyo (JP)

(72) Inventor: Masato Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 831 days.

(21) Appl. No.: 16/477,234

(22) PCT Filed: Jan. 17, 2018

(86) PCT No.: PCT/JP2018/001151
§ 371 (c)(1),
(2) Date: Jul. 11, 2019

(87) PCT Pub. No.: WO2018/135516
PCT Pub. Date: Jul. 26, 2018

(65) Prior Publication Data
US 2021/0133552 A1 May 6, 2021

(30) Foreign Application Priority Data
Jan. 19, 2017 (JP) .............................. JP2017-007614

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC .......... G06N 3/08; G06N 3/084; G06N 3/088; G06N 3/0454; G06T 2207/20081; G06T 2207/20084; G06V 10/82
See application file for complete search history.

(56) References Cited

U.S. PATENT DOCUMENTS

| 2015/0134583 | A1 | 5/2015 | Tamatsu et al. |
| 2016/0307096 | A1 | 10/2016 | Goel et al. |
| 2016/0321784 | A1* | 11/2016 | Annapureddy ........ G06N 3/082 |

FOREIGN PATENT DOCUMENTS

| JP | H06-35889 A | 2/1994 |
| JP | 2015-095215 A | 5/2015 |

(Continued)

OTHER PUBLICATIONS

International Search Report for PCT Application No. PCT/JP2018/001151, dated Apr. 17, 2018.

(Continued)

*Primary Examiner* — Geoffrey E Summers
(74) *Attorney, Agent, or Firm* — Sughrue Mion, PLLC (57) ABSTRACT

A neural network learning device 20 is equipped with: a determination module 22 that determines the size of a local region in learning information 200 which is to be learned by a neural network 21 containing multiple layers, said determination being made for each layer, on the basis of the structure of the neural network 21; and a control module 25 that, on the basis of size of the local region as determined by the determination module 22, extracts the local region from the learning information 200, and performs control such that the learning of the learning information represented by the extracted local region by the neural network 200 is carried out repeatedly while changing the size of the extracted local region, and thus, a reduction in the generalization performance of the neural network can be avoided even when there is little learning data.

7 Claims, 8 Drawing Sheets

(56) References Cited

FOREIGN PATENT DOCUMENTS

| | | |
|---|---|---|
| JP | 2016-139176 A | 8/2016 |
| WO | 2016/160237 A1 | 10/2016 |

OTHER PUBLICATIONS

English translation of Written opinion for PCT Application No. PCT/JP2018/001151.
Japanese Office Communication for JP Application No. 2018-563355 dated Feb. 22, 2022 with English Translation.

* cited by examiner

NEURAL NETWORK LEARNING DEVICE, NEURAL NETWORK LEARNING METHOD, AND RECORDING MEDIUM ON WHICH NEURAL NETWORK LEARNING PROGRAM IS STORED

This application is a National Stage Entry of PCT/JP2018/001151 filed on Jan. 17, 2018, which claims priority from Japanese Patent Application 2017-007614 filed on Jan. 19, 2017, the contents of all of which are incorporated herein by reference, in their entirety.

TECHNICAL FIELD

The invention of the present application relates to a technique for controlling learning by a neural network.

BACKGROUND ART

In recent years, because of rapid development of a technique related to artificial intelligence (AI), a neural network constituting AI has been drawing attention in various technical fields. As one such technical field, there is a pattern recognition technique. A pattern recognition technique is a technique for estimating which class (category) an input pattern belongs to. As a specific example related to such pattern recognition, object recognition for estimating what an object included in an input image is, voice recognition for estimating a speech content from input voice, or the like is cited, for example.

In a pattern recognition technique, statistic machine learning is widely utilized. Further, in recent years, because of rapid development of a learning technique called deep learning, a neural network has been becoming able to perform accurate recognition of a diversely fluctuating input pattern without being affected by the fluctuation. In view of such a background, there is a rising expectation for a technique for efficiently performing learning by a neural network, and enabling a neural network to more accurately make a determination.

As a technique associated with such a technique, PTL 1 discloses an image processing device which shortens a learning time of a multi-layer neural network when a registered category is updated. This multi-layer neural network performs processing of outputting an output value to a processing unit in a layer at a next stage, on the basis of a result of applying spatial filters differing from each other to an input image. This multi-layer neural network includes an anterior layer and a posterior layer. The anterior layer finally generates each of a plurality of feature amounts. The posterior layer finally classifies an input image into one of a plurality of categories by performing processing of outputting an output value to a processing unit in a layer at a next stage on the basis of a result of applying weighting factors differing from each other to the plurality of feature amounts. When a category is updated, the image processing device corrects a value of a weighting factor in a posterior layer without correcting a value of a filter in an anterior layer.

Furthermore, PTL 2 discloses a learning device which performs learning by a forward propagation type multi-layer neural network through supervised learning. This learning device performs learning by cost calculation using a training data set with regard to a multi-layer neural network having, in a hidden layer, a probing neuron which does not forwardly propagate to an output layer. Then, after removing an upper layer of the multi-layer neural network on the basis of a cost of the probing neuron, this learning device designates a probing neuron of a remaining uppermost layer as an output layer.

CITATION LIST

Patent Literature

[PTL 1] Japanese Unexamined Patent Application Publication No. 2016-139176
[PTL 2] Japanese Unexamined Patent Application Publication No. 2015-095215

SUMMARY OF INVENTION

Technical Problem

In deep learning performed by a neural network, there are a considerable number of parameters to learn, and thus, a large amount of learning data is generally needed. Moreover, it is known that, when an amount of learning data is small, generalization performance is significantly reduced due to overfitting. Overfitting refers to a situation where a neural network can be adapted to input learning data, but cannot be adapted (i.e., cannot be generalized) to unknown data.

In deep learning, learning is generally performed on the basis of back propagation. In back propagation, by backwardly propagating an error from an output layer toward an input layer in a multi-layer neural network, learning is performed in such a way that the error in the output layer is decreased. When an amount of learning data is small, a neural network can sufficiently decrease an error by learning only in a high-order layer close to an output layer. In this case, there occurs a phenomenon in which learning in a high-order layer advances, and learning in a low-order layer close to an input layer does not advance. Thus, a neural network gets into an overfitted state, and there is a problem that generalization performance of the neural network is reduced. PTLs 1 and 2 do not refer to this problem. A main object of the invention of the present application is to provide a neural network learning device and the like which solve such a program.

Solution to Problem

A neural network learning device according to one aspect of the invention of the present application includes: a determination means for determining a size of a local region in learning information which is targeted for learning by a neural network including a plurality of hierarchical layers, for each of the hierarchical layers, based on a structure of the neural network; and a control means for controlling in such a way as to repeat extracting the local region from the learning information, based on the size of the local region which is determined by the determination means, and learning, by the neural network, the learning information being represented by the local region being repeatedly extracted, while changing the size of the local region being extracted from the learning information.

In another aspect of achieving the above-described object, a neural network learning method according to one aspect of the invention of the present application includes: by an information processing device, determining a size of a local region in learning information which is targeted for learning by a neural network including a plurality of hierarchical layers, for each of the hierarchical layers, based on a structure of the neural network; and controlling in such a way as to repeat extracting the local region from the learning information, based on the size of the local region which is determined, and learning, by the neural network, the learning information being represented by the local region being extracted, while changing the size of the local region being extracted from the learning information.

Moreover, in a further aspect of achieving the above-described object, a neural network learning program according to one aspect of the invention of the present application which causes a computer to execute: determination processing of determining a size of a local region in learning information which is targeted for learning by a neural network including a plurality of hierarchical layers, for each of the hierarchical layers, based on a structure of the neural network; and control processing of controlling in such a way as to repeat extracting the local region from the learning information, based on the size of the local region which is determined by the determination processing, and learning, by the neural network, the learning information being represented by the local region being extracted, while changing the size of the local region being extracted from the learning information.

Furthermore, the invention of the present application can also be implemented by a computer-readable and non-volatile recording medium on which the neural network learning program (computer program) is stored.

Advantageous Effects of Invention

The invention of the present application is able to avoid reduction of generalization performance of a neural network even when learning data are small in amount.

EXAMPLE EMBODIMENT

Hereinafter, example embodiments of the invention of the present application are described in detail with reference to the drawings.

First Example Embodiment

Figure 1:
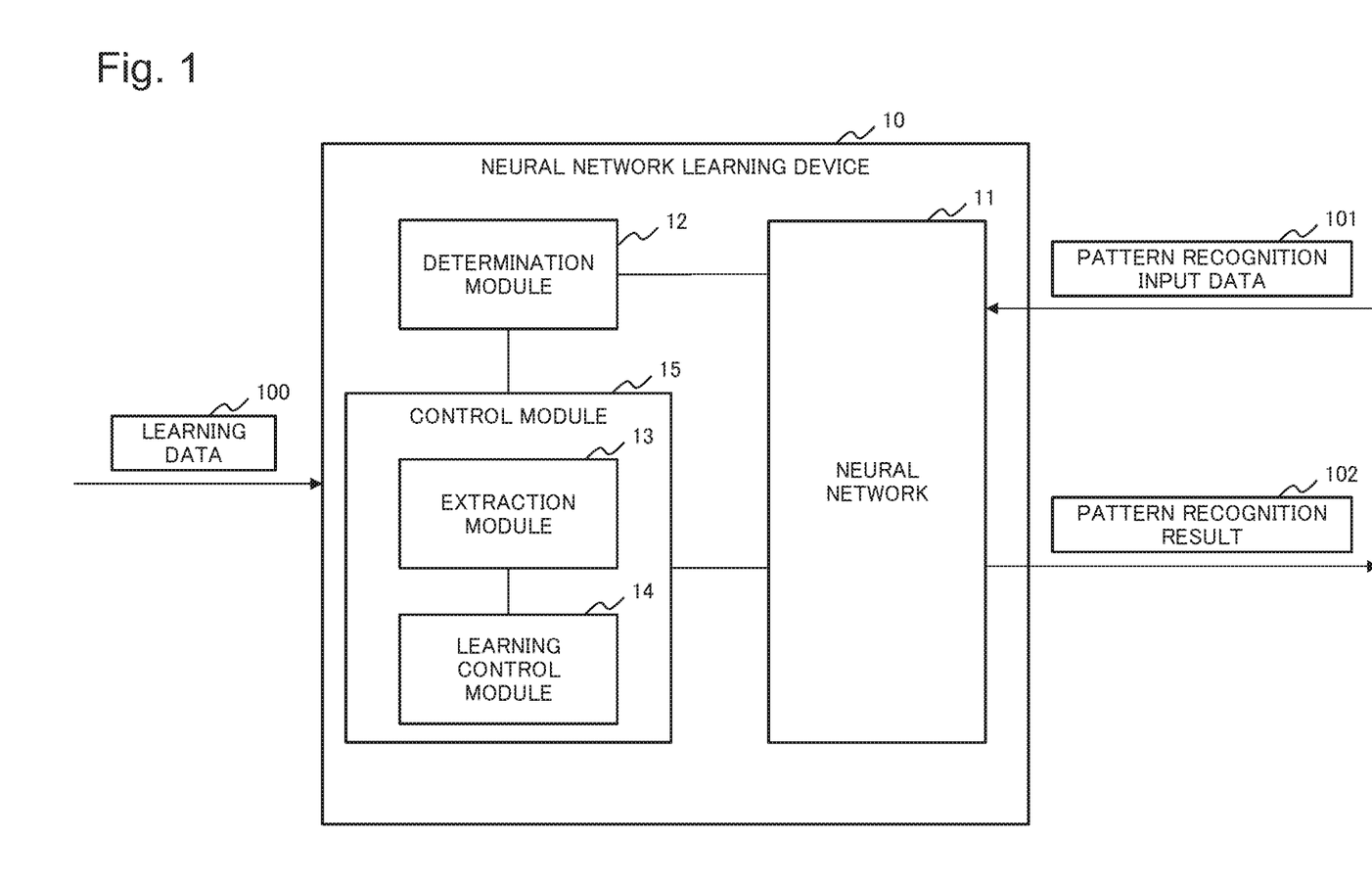
FIG. 1 is a block diagram illustrating a configuration of a neural network learning device 10 according to a first example embodiment of the invention of the present application.

FIG. 1 is a block diagram schematically illustrating a configuration of a neural network learning device 10 according to a first example embodiment of the invention of the present application. The neural network learning device 10 is a device which performs deep learning by input learning data 100 (learning information), and performs processing such as pattern recognition, based on a result of the learning. The learning data 100 are, for example, supervised data including a combination of data (problem) representing a target for which pattern recognition is performed, and a recognition result (answer) to be expected.

The neural network learning device 10 includes a neural network 11, a determination module 12, and a control module 15.

The neural network 11 is a multi-layer neural network including a plurality of hierarchical layers (layers), and performs deep learning by using input learning data 100. When input data (pattern recognition input data 101) representing a target for which pattern recognition is to be performed are input, the neural network 11 performs pattern recognition processing on the basis of a learning result, and outputs a result of the processing as a pattern recognition result 102. As this pattern recognition processing, the neural network 11 performs, for example, face recognition processing, object recognition processing, voice recognition processing, or the like.

Figure 2:
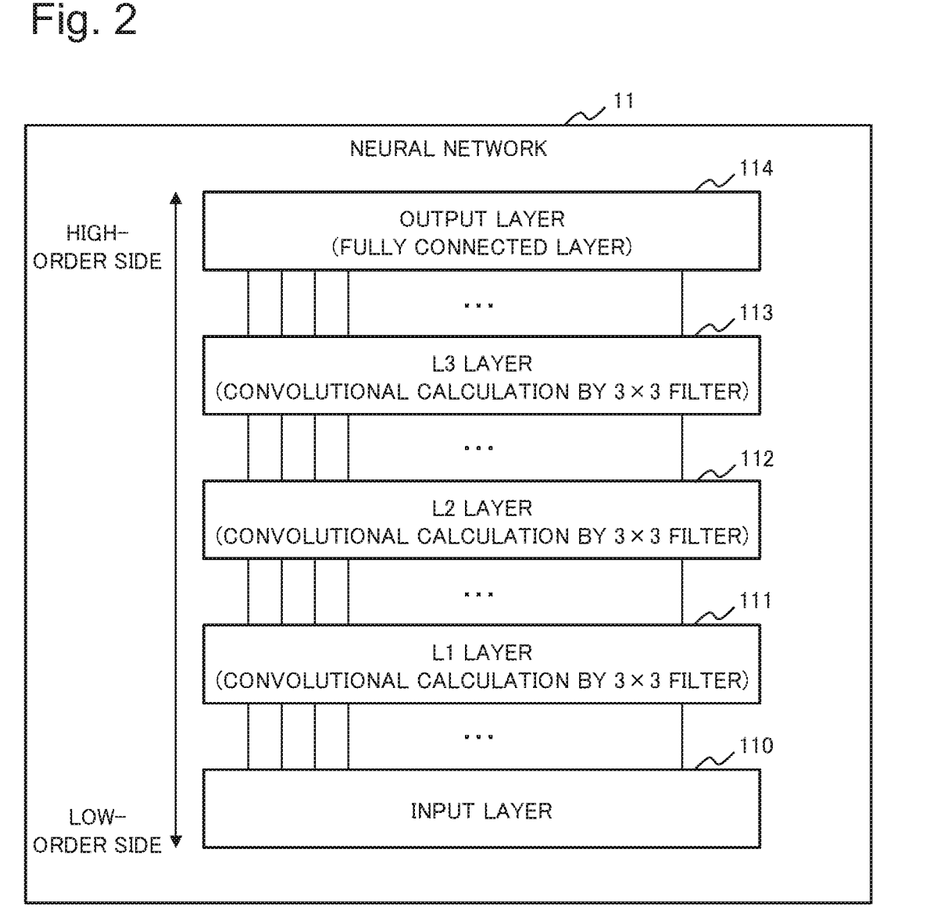
FIG. 2 is a diagram exemplifying a hierarchical structure of a neural network 11 according to the first example embodiment of the invention of the present application.

FIG. 2 is a diagram conceptually exemplifying a hierarchical structure of the neural network 11 according to the present example embodiment. The neural network 11 includes an input layer 110, an L1 layer 111, an L2 layer 112, an L3 layer 113, and an output layer 114. The L1 layer 111, the L2 layer 112, and the L3 layer 113 are intermediate layers (hidden layers). An intermediate layer according to the present example embodiment has a three-layer configuration, but an intermediate layer is not limited to a three-layer configuration.

The input layer 110, the L1 layer 111, the L2 layer 112, the L3 layer 113, and the output layer 114 are, for example, units each having a neuron element (not illustrated) imitating a neural circuit of a creature. In the present example embodiment, the output layer 114 side is defined as a high-order side (next-stage side or posterior-stage side), and the input layer 110 side is defined as a low-order side (an anterior-stage side).

When the neural network 11 performs pattern recognition, the intermediate layers (i.e., the L1 layer 111, the L2 layer 112, and the L3 layer 113) each perform recognition processing for data representing a recognition target after data (image data, voice data, or the like) representing the recognition target are input to the input layer 110, and the output layer outputs a result of the recognition.

The neural network 11 according to the present example embodiment is configured as, for example, a convolutional neural network (CNN) which is well known in a technical field such as deep learning. In a "convolutional" calculation performed in a CNN, for example, when image data representing a recognition target are represented as a matrix (each element of a matrix is equivalent to one pixel), a sliding window function (filter) and the matrix are multiplied element by element. In this "convolutional" calculation, overall convolution is then performed by performing, for each element, a calculation of summing element-by-element multiplication values while sliding a filter (kernel) in such a way as to cover the entire matrix. It is assumed that all of the L1 layer 111, the L2 layer 112, and the L3 layer 113 according to the present example embodiment perform a convolutional calculation by a filter (hereinafter, referred to as a "3×3 filter" in the present application) having a size of "3×3". However, a size of a window when, for example, a convolutional calculation is applied to these intermediate layers by use of a filter is not limited to "3×3".

Recognition processing performed by intermediate layers included in the neural network 11 becomes higher in level from a layer located on a low-order side toward a layer located on a high-order side. For example, when the neural network 11 performs face recognition processing, the L1 layer 111 performs processing of detecting an edge from face image data (pixel data) representing a recognition target. The L2 layer 112 performs processing of detecting a simple shape (an element or the like constituting a face) in a face image by using the edge detected by the L1 layer 111. Then, the L3 layer 113 performs processing of detecting a more complicated feature needed for identification of a person, by using the simple shape detected by the L2 layer 112.

Figure 3:
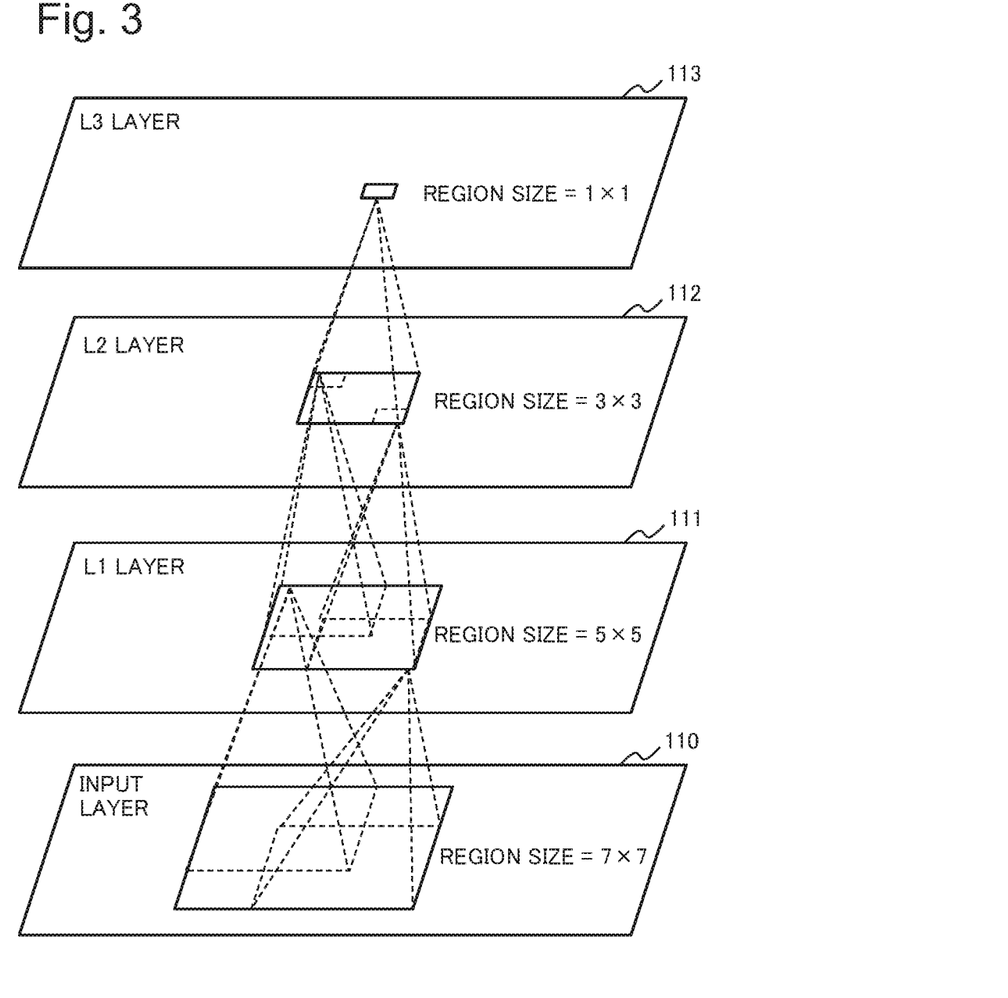
FIG. 3 is a diagram exemplifying a relation between a convolutional calculation performed by an intermediate layer included in the neural network 11 according to the first example embodiment of the invention of the present application, and a size of a local region targeted for learning.

FIG. 3 is a diagram schematically exemplifying a relation between a convolutional calculation performed by an intermediate layer included in the neural network 11 according to the present example embodiment, and a size of a partial region (hereinafter, referred to as a "local region" in the present application) in the learning data 100 input to the input layer 110 which is targeted for learning by the neural network 11.

The L3 layer 113 performs a convolutional calculation by a 3×3 filter for an output from the L2 layer 112. In this case, a size of a region (hereinafter, referred to as a "learning target region") targeted for learning in the L2 layer 112 related to (based on) one element (region size=1×1) in the L3 layer 113 becomes "3×3". The L2 layer 112 performs a convolutional calculation by a 3×3 filter for an output from the L1 layer 111. Therefore, a region of "5×5" being a region in which a region of "3×3" in the L2 layer is movable by a maximum of two elements in a row direction and a column direction is a learning target region in the L1 layer 111 related to the element in the L3 layer 113. The L1 layer 111 performs a convolutional calculation by a 3×3 filter for an output from the input layer 110. Therefore, a region of "7×7" being a region in which a region of "5×5" in the L1 layer is movable by a maximum of two elements in a row direction and a column direction is a learning target region in the input layer 110 related to the element in the L3 layer 113.

FIG. 3 represents the above-described relation, and illustrates that a minimum value of a size of a learning target region in the input layer 110 at which a learning effect is expected in relation to the L3 layer 113 is "7×7". In other words, when a size of a learning target region is less than "7×7", valid data exist only in a central part of a filter in relation to the L3 layer 113 and therefore, learning becomes difficult. Similarly, a minimum value of a size of a learning target region in the input layer 110 at which a learning effect is expected in relation to the L2 layer 112 is "5×5". Moreover, similarly, a minimum value of a size of a learning target region in the input layer 110 at which a learning effect is expected in relation to the L1 layer 111 is "3×3".

As described above, in the neural network 11, a layer located closer to a high-order side performs higher-level recognition processing in general. Then, as recognition processing to be performed becomes higher in level, learning using a wider-range local region (learning target region) is needed. Therefore, in order to enjoy a processing result having high accuracy during operation after learning, a minimum value of a size of a learning target region needs to be small in relation to the L1 layer 111, and large in relation to the L3 layer 113.

The neural network learning device 10 according to the present example embodiment controls in such a way that the neural network 11 performs a plurality of times of learning in which a size of a learning target region is changed for the learning data 100 in consideration of a size difference of needed learning target regions related to the above-described different intermediate layers. In other words, the determination module 12 illustrated in FIG. 1 determines, for each of the L1 layer 111, the L2 layer 112, and the L3 layer 113, a size of a local region (learning target region) in the input layer 110 which is targeted for learning by the neural network 11, on the basis of a structure of the neural network 11. As a structure of the neural network 11, the determination module 12 uses, for example, a size of a filter related to each of the L1 layer 111, the L2 layer 112, and the L3 layer 113 which perform a convolutional calculation by the filter.

Figure 4:
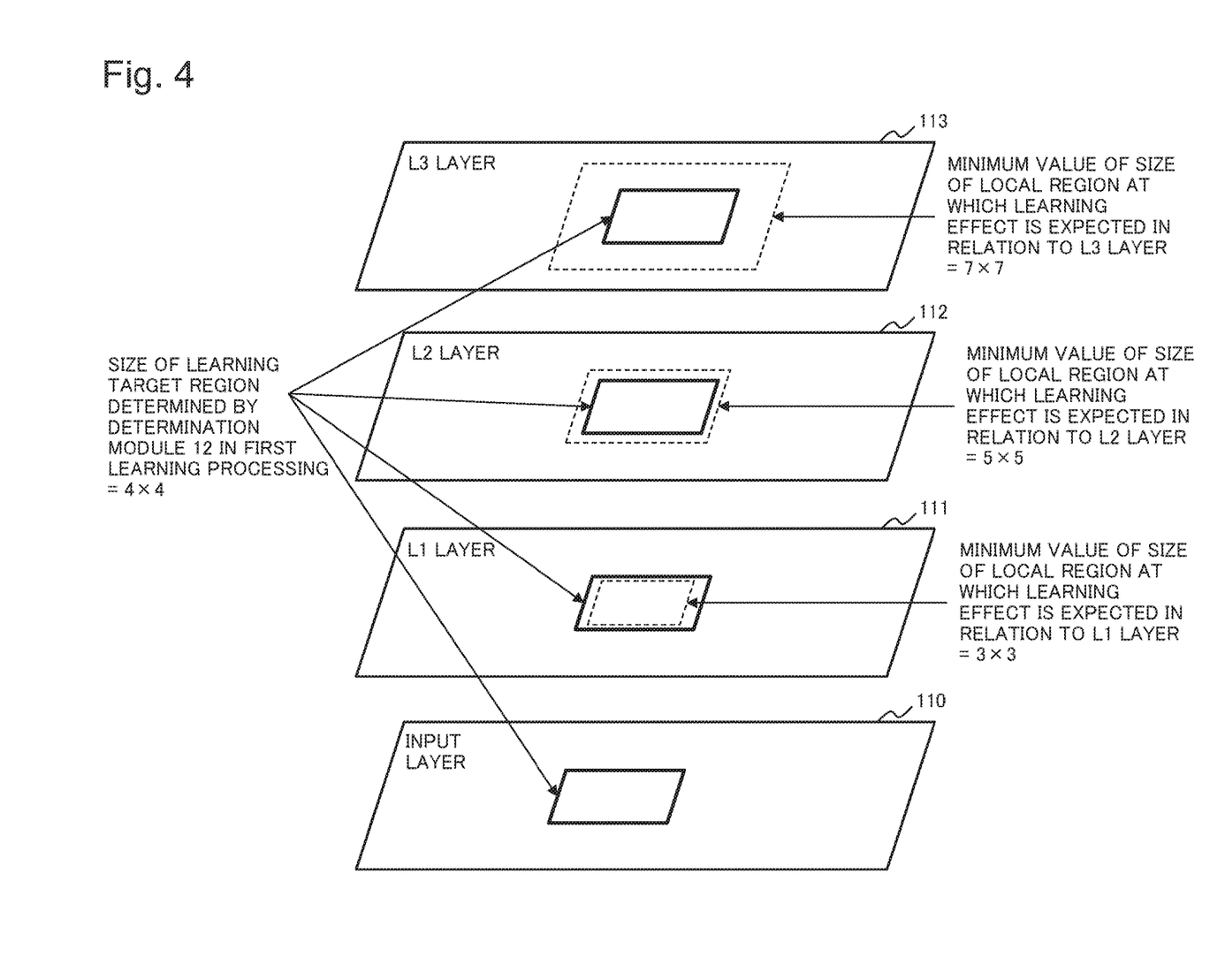
FIG. 4 is a diagram exemplifying a relation between a size of a local region determined as a learning target in first learning processing by a determination module 12 according to the first example embodiment of the invention of the present application, and a minimum value of a size of a local region at which a learning effect is expected in each layer.

FIG. 4 is a diagram exemplifying a relation between a size of a learning target region determined as a learning target in first learning processing by the determination module 12 according to the present example embodiment, and a minimum value of a size of a local region at which a learning effect is expected in each layer. The determination module 12 determines a size of a learning target region in such a way as to satisfy, in first learning processing, a condition of being equal to or more than a minimum value of a size of a local region at which a learning effect related to the L1 layer 111 is expected, and being less than a minimum value of a size of a local region at which a learning effect related to the L2 layer 112 is expected. More specifically, as illustrated in FIG. 4, a minimum value of a size of a local region at which a learning effect in the L1 layer 111 is expected is "3×3", and a minimum value of a size of a local region at which a learning effect in the L2 layer 112 is expected is "5×5". Therefore, in this case, in order to satisfy the condition, the determination module 12 determines a size of a local region determined as a first learning target, to be, for example, "4×4".

Figure 5:
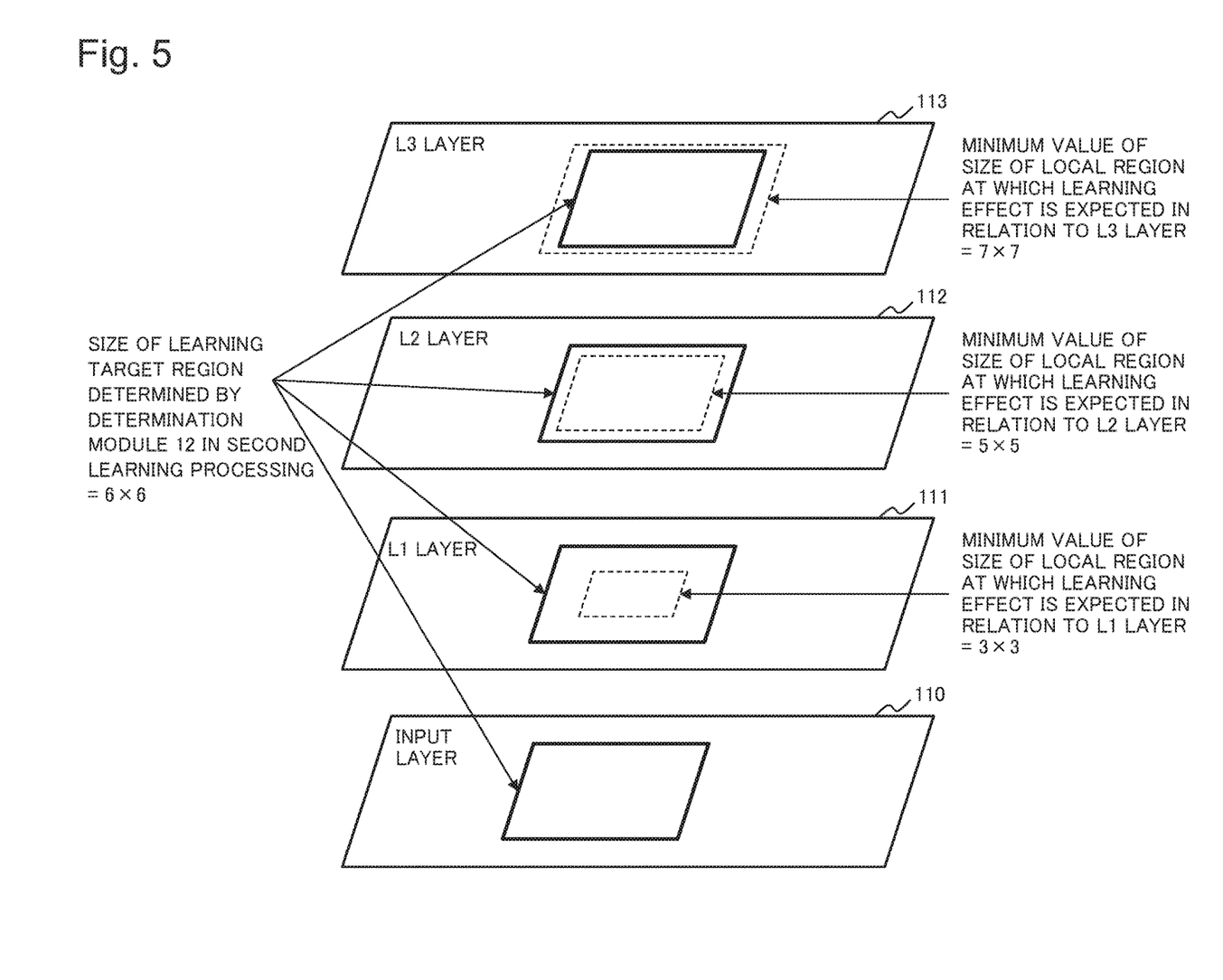
FIG. 5 is a diagram exemplifying a relation between a size of a local region determined as a learning target in second learning processing by the determination module 12 according to the first example embodiment of the invention of the present application, and a minimum value of a size of a local region at which a learning effect is expected in each layer.

The determination module 12 then determines a size of a learning target region in second learning processing, on the basis of a structure of the neural network 11. FIG. 5 is a diagram exemplifying a relation between a size of a local region determined as a second learning target by the determination module 12 according to the present example embodiment, and a minimum value of a size of a local region at which a learning effect is expected in each layer. The determination module 12 determines a size of a learning target region in such a way as to satisfy, in the second learning processing, a condition of being equal to or more than a minimum value of a size of a local region at which a learning effect in the L2 layer 112 is expected, and being less than a minimum value of a size of a local region at which a learning effect in the L3 layer 113 is expected. More specifically, as illustrated in FIG. 5, a minimum value of a size of a local region at which a learning effect in the L2 layer 112 is expected is "5×5", and a minimum value of a size of a local region at which a learning effect in the L3 layer 113 is expected is "7×7". Therefore, in this case, in order to satisfy the condition, the determination module 12 determines a size of a local region determined as a second learning target, to be, for example, "6×6".

The determination module 12 then determines a size of a learning target region in such a way as to satisfy, in relation to third learning processing, a condition of being equal to or more than a minimum value of a size of a local region at which a learning effect in the L3 layer 113 is expected. Note that, in the present example embodiment, the L3 layer 113 is a layer located on a highest order in an intermediate layer, and therefore, the condition does not include "being less than a minimum value of a size of a local region at which a learning effect in a layer located at a next stage is expected". Thus, in this case, the determination module 12 determines a size of a third learning target region to be, for example, "8×8".

The control module 15 illustrated in FIG. 1 includes an extraction module 13 and a learning control module 14. On the basis of a size of the learning target region determined by the determination module 12, the extraction module 13 repeatedly extracts a local region from the learning data 100 while changing a size of the local region. In other words, the extraction module 13 extracts a local region having a size of "4×4" from the learning data 100 in first learning processing. The extraction module 13 extracts a local region having a size of "6×6" from the learning data 100 in second learning processing. The extraction module 13 extracts a local region having a size of "8×8" from the learning data 100 in third learning processing. In this instance, the extraction module 13 may divide the learning data 100 into a size of a local region determined by the determination module 12, or may permit overlapping of a plurality of local regions and then randomly extract a plurality of local regions.

The learning control module 14 controls the neural network 11 in such a way that the neural network 11 repeatedly learns with an input of local regions repeatedly extracted by the extraction module 13. In other words, the learning control module 14 controls the neural network 11 in such a way that the neural network 11 learns with an input of a local region having a size of "4×4" in first learning processing. In this case, as described above, the neural network 11 performs learning related to the L1 layer 111 because learning related to the L2 layer 112 and the L3 layer 113 is difficult.

The learning control module 14 controls the neural network 11 in such a way that the neural network 11 learns with an input of a local region having a size of "6×6" in second learning processing. In this case, the neural network 11 performs learning related to the L1 layer 111 and the L2 layer 112 because learning related to the L3 layer 113 is difficult. Then, the learning control module 14 controls the neural network 11 in such a way that the neural network 11 learns with an input of a local region having a size of "8×8" in third learning processing. In this case, the neural network 11 performs learning related to the L1 layer 111 to the L3 layer 113.

The neural network 11 performs the above-described learning by use of, for example, stochastic gradient descent or the like based on back propagation, which is a learning method frequently used in general.

Next, an operation (processing) when the neural network learning device 10 according to the present example embodiment is equipped with each of the above-described modules is described in detail with reference to a flowchart in FIG. 6.

The neural network learning device 10 repeatedly executes processing from a step S102 to a step S104 while changing a variable i (i is one of integers 1 to 3) from 1 to 3 (step S101).

On the basis of a structure of the neural network 11, the determination module 12 determines a size of a learning target region in such a way as to satisfy a condition of being equal to or more than a minimum value of a size of a local region at which a learning effect in an Li layer is expected, and being less than a minimum value of a size of a local region at which a learning effect in an L(i+1) layer is expected (step S102).

The extraction module 13 included in the control module 15 extracts a learning target region from the learning data 100 on the basis of a size of the learning target region determined by the determination module 12 (step S103). The learning control module 14 included in the control module 15 controls the neural network 11 in such a way that the neural network 11 learns with an input of a learning target region extracted by the determination module 12 (step S104).

When a variable i is less than 3, the neural network learning device 10 adds 1 to the variable i, and then executes processing from the step S102, whereas, when a variable i is 3, the neural network learning device 10 ends the whole processing (step S105).

Figure 6:
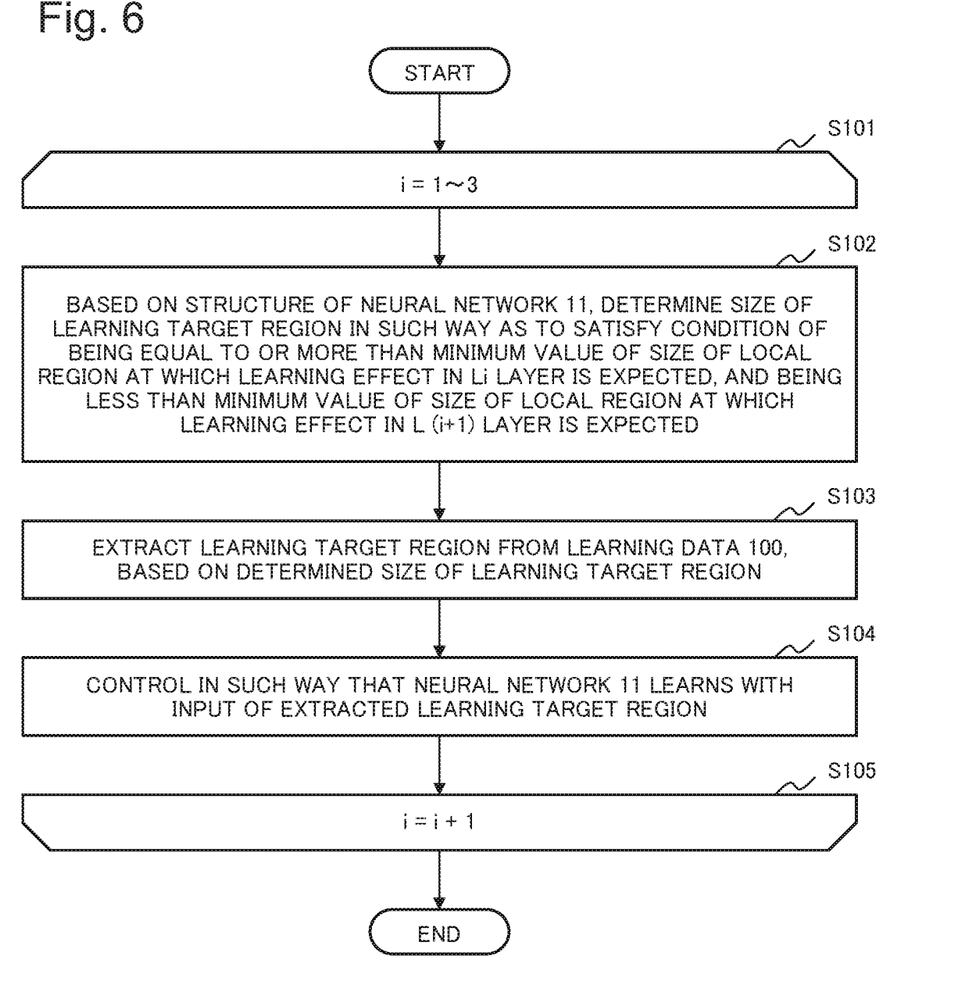
FIG. 6 is a flowchart illustrating an operation of the neural network learning device 10 according to the first example embodiment of the invention of the present application.

Note that, although the neural network learning device 10 repeatedly performs the steps S102 to S104 in the flowchart illustrated in FIG. 6, a flow performed by the neural network learning device 10 may be different from this. For example, the neural network learning device 10 may repeatedly perform S103 to S104 illustrated in FIG. 6 after determining all sizes of learning target regions for the respective intermediate layers (i.e., after completing the step S102 for all values that can be taken by a variable i).

The neural network learning device 10 according to the present example embodiment is able to avoid reduction of generalization performance of a neural network even when learning data are small in amount. A reason for this is that the neural network learning device 10 determines a size of a learning target region for each hierarchical layer on the basis of a structure of a neural network including a plurality of hierarchical layers, and controls in such a way that the neural network repeatedly learns with an input of a local region extracted in the size.

An advantageous effect implemented by the neural network learning device 10 according to the present example embodiment is described below in detail.

It is known that, in deep learning performed by a neural network, generalization performance is significantly reduced due to overfitting when an amount of learning data is small. In deep learning, generally, learning is performed on the basis of back propagation in such a way that an error in the output layer is decreased by backwardly propagating an error from an output layer toward an input layer. When an amount of learning data is small, a neural network can sufficiently decrease an error by learning only in a high-order layer close to an output layer. However, in this case, there occurs a phenomenon in which learning in a high-order layer advances, and learning in a low-order layer close to an input layer does not advance. Thus, a neural network gets into an overfitted state, and there is a problem that generalization performance of the neural network is reduced.

For such a problem, the neural network learning device 10 according to the present example embodiment includes the determination module 12 and the control module 15. Further, the control module 15 includes the extraction module 13 and the learning control module 14. In other words, the determination module 12 determines, for each hierarchical layer, a size of a local region in the input layer 110 which is targeted for learning by the neural network 11 including a plurality of hierarchical layers, on the basis of a structure of the neural network 11. On the basis of a size of the local region (learning target region) determined by the determination module 12, the extraction module 13 repeatedly extracts a local region while changing a size of the local region. Then, the learning control module 14 controls the neural network 11 in such a way that the neural network 11 repeatedly learns with an input of local regions repeatedly extracted by the extraction module 13.

More specifically, the neural network learning device 10 according to the present example embodiment first controls in such a way that the neural network 11 learns with an input of a local region (learning target region) having such a size that learning related to the L1 layer 111 advances, and learning related to the L2 layer 112 and the L3 layer 113 does not advance. The neural network learning device 10 then controls in such a way that the neural network 11 learns with an input of a local region having such a size that learning related to the L1 layer 111 and the L2 layer 112 advances, and learning related to the L3 layer 113 does not advance. Thereafter, the neural network learning device 10 controls the neural network 11 in such a way that the neural network 11 learns with an input of a local region having such a size that learning related to the L1 layer 111 to the L3 layer 113 advances. Thus, the neural network learning device 10 according to the present example embodiment is able to avoid reduction of generalization performance of the neural network 11 by controlling in such a way that the neural network 11 efficiently learns even when learning data are small in amount.

Furthermore, the determination module 12 according to the present example embodiment determines a size of a local region for a first hierarchical layer in such a way as to satisfy a condition of being equal to or more than a minimum value of a size of a local region at which a learning effect related to the first hierarchical layer is expected, and being less than a minimum value of a size of a local region at which a learning effect related to a second hierarchical layer adjacent to the first hierarchical layer is expected. Then, the determination module 12 determines a size of a local region on the basis of a size of a filter related to a hierarchical layer for which a convolutional calculation by the filter is performed. Thus, the neural network learning device 10 according to the present example embodiment is able to certainly avoid reduction of generalization performance of the neural network 11.

Second Example Embodiment

Figure 7:
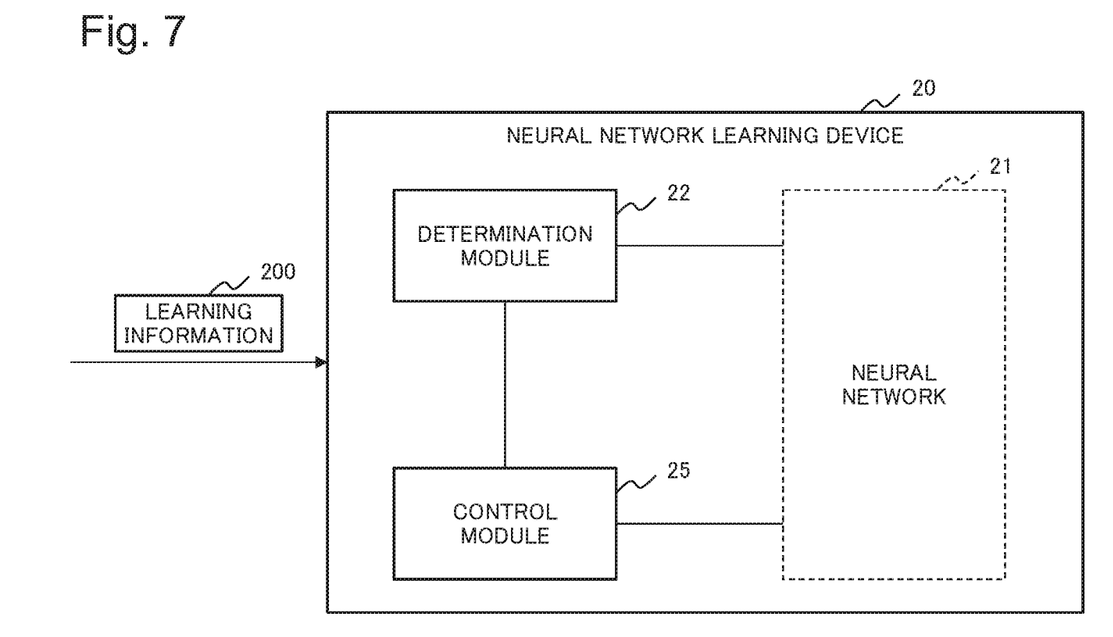
FIG. 7 is a block diagram illustrating a configuration of a neural network learning device 20 according to a second example embodiment of the invention of the present application.

FIG. 7 is a block diagram schematically illustrating a configuration of a neural network learning device 20 according to a second example embodiment of the invention of the present application.

The neural network learning device 20 according to the present example embodiment includes a determination module 22 and a control module 25.

The determination module 22 determines, for each hierarchical layer, a size of a local region in learning information 200 which is targeted for learning by a neural network 21 including a plurality of hierarchical layers, on the basis of a structure of the neural network 21.

The control module 25 extracts a local region from the learning information 200 on the basis of a size of the local region determined by the determination module 22.

The control module 25 controls in such a way that the neural network 21 repeatedly performs learning of learning information represented by the extracted local region while changing a size of the local region extracted from the learning information 200.

The neural network learning device 20 according to the present example embodiment is able to avoid reduction of generalization performance of a neural network even when learning data are small in amount. A reason for this is that the neural network learning device 20 determines, for each hierarchical layer, a size of a local region targeted for learning on the basis of a structure of a neural network including a plurality of hierarchical layers, and controls in such a way that the neural network repeatedly learns with an input of the local region extracted in the size.

<Hardware Configuration Example>

In each of the example embodiments described above, each unit in the neural network learning devices 10 and 20 illustrated in FIGS. 1 and 7 can be implemented by dedicated hardware (HW) (electronic circuitry). Moreover, in FIGS. 1 and 7, at least the following configuration can be considered as a functional (processing) unit (software module) of a software program.

the determination modules 12 and 22, and
the control modules 15 and 25.

However, segmentation of each unit illustrated in these drawings is a configuration for convenience of description, and various configurations can be assumed at implementation. One example of a hardware environment in this case is described with reference to FIG. 8.

Figure 8:
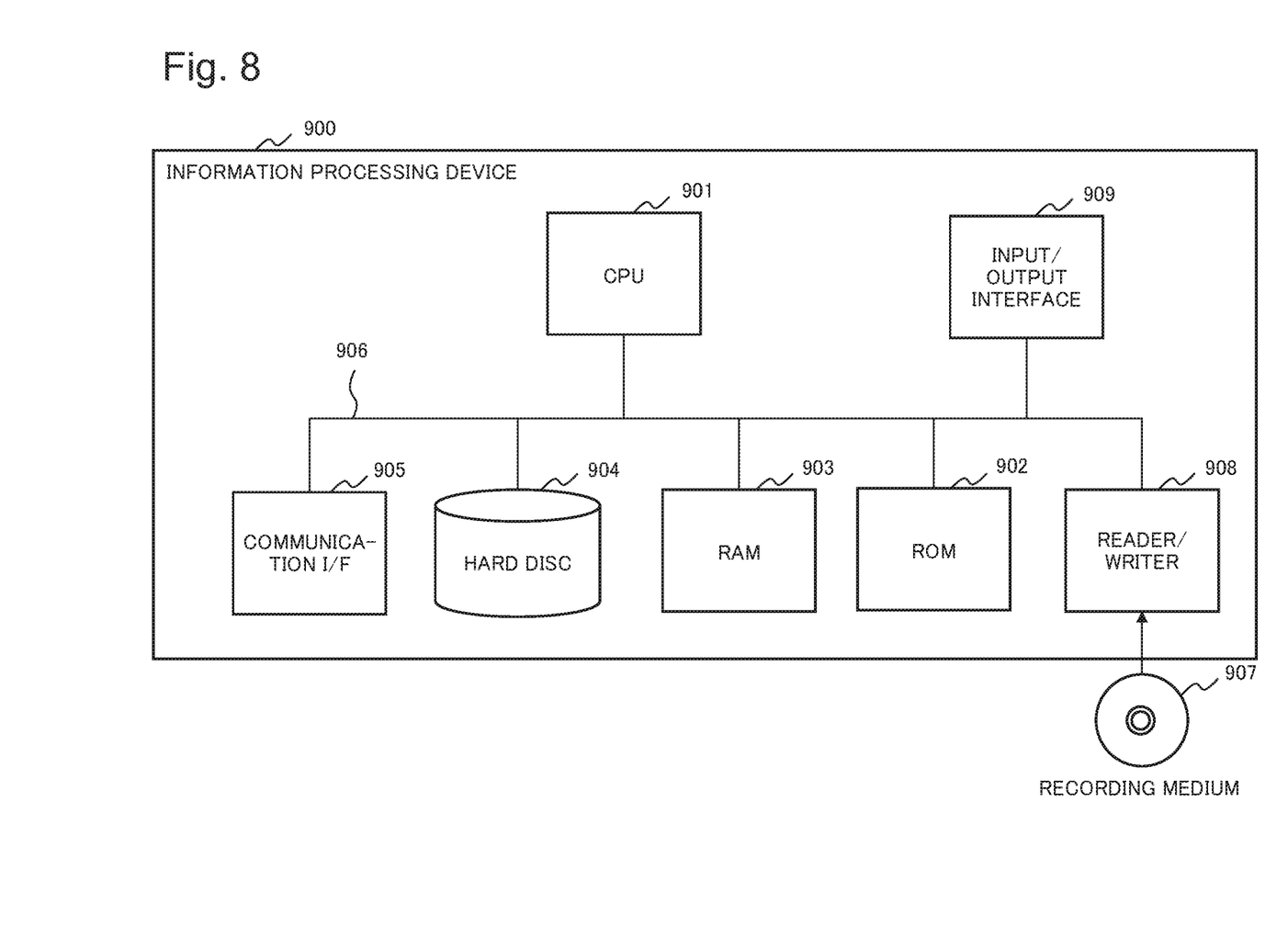
FIG. 8 is a block diagram illustrating a configuration of an information processing device 900 which can execute a neural network learning device according to each example embodiment of the invention of the present application.

FIG. 8 is a diagram exemplarily describing a configuration of an information processing device 900 (a computer) which can execute the neural network learning device according to each example embodiment of the invention of the present application. In other words, FIG. 8 represents a configuration of a computer (an information processing device) which can implement the neural network learning devices illustrated in FIGS. 1 and 7 or a part of the device, and a hardware environment which can implement each function in the example embodiments described above. The information processing device 900 illustrated in FIG. 8 includes the followings as components.

a central processing unit (CPU) 901,
a read only memory (ROM) 902,
a random access memory (RAM) 903,
a hard disc (storage device) 904,
a communication interface 905 with an external device such as a wireless transmission/reception unit,
a bus 906 (communication wire),
a reader/writer 908 which can read and write data stored in a recording medium 907 such as a compact disc read only memory (CD-ROM), and
an input/output 909.

In other words, the information processing device 900 including the above-described components is a general computer in which these components are connected via the bus 906. The information processing device 900 includes a plurality of CPUs 901 in one case, or includes a multicore CPU 901 in another case.

Furthermore, the invention of the present application described with the above-described example embodiments as examples supplies the information processing device 900 illustrated in FIG. 8 with a computer program which can implement the following function. The function is a function of the above-described configuration in the block configuration diagrams (FIGS. 1 and 7) referred to in the description of the example embodiments, or the flowchart (FIG. 6). Thereafter, the invention of the present application is accomplished by reading the computer program in the CPU 901 of the hardware, and then interpreting and executing the computer program. Further, the computer program supplied into the device has only to be stored in a readable/writable volatile memory (the RAM 903), or a non-volatile storage device such as the ROM 902 or the hard disc 904.

Still further, in the above-described case, a general procedure can be adopted at present as a method of supplying a computer program into the hardware. As the procedure, there is, for example, a method of installing into the device via various recording media 907 such as a CD-ROM, a method of downloading from outside via a communication line such as the Internet, or the like. Moreover, in such a case, it can be considered that the invention of the present application is configured by a code constituting the computer program, or a recording medium 907 storing the code.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-007614, filed on Jan. 19, 2017, the disclosure of which is incorporated herein in its entirety by reference.

REFERENCE SIGNS LIST

10 Neural network learning device
11 Neural network
110 Input layer
111 L1 layer
112 L2 layer
113 L3 layer
114 Output layer
12 Determination module
13 Extraction module
14 Learning control module
15 Control module
100 Learning data
101 Pattern recognition input data
102 Pattern recognition result
20 Neural network learning device
21 Neural network
22 Determination module
25 Control module
200 Learning information
900 Information processing device
901 CPU
902 ROM
903 RAM
904 Hard disc (storage device)
905 Communication interface
906 Bus
907 Recording medium
908 Reader/writer
909 Input/output interface

What is claimed is:

1. A neural network learning device comprising:
   at least one memory storing a computer program; and
   at least one processor configured to execute the computer program to
   determine a size of a local region in learning information for each of a plurality of hierarchical layers, based on a structure of a neural network, the local region being targeted for learning by the neural network including the hierarchical layers;
   control in such a way as to repeat extracting the local region from the learning information, based on the size of the local region which is determined, and learning, by the neural network, the learning information being represented by the local region being extracted, while changing the size of the local region being extracted from the learning information; and
   determine the size of the local region for a first hierarchical layer of the hierarchical layers in such a way as to satisfy being equal to or more than a minimum value of the size of the local region at which a learning effect related to the first hierarchical layer is expected, and being less than a minimum value of the size of the local region at which a learning effect in a second hierarchical layer of the hierarchical layers being located at a stage next to the first hierarchical layer is expected.

2. The neural network learning device according to claim 1, wherein the processor is configured to execute the computer program to
   determine the size of the local region, based on a size of a filter related to the hierarchical layer which performs a convolutional calculation by the filter.

3. The neural network learning device according to claim 1, wherein
   the neural network which performs pattern recognition processing.

4. The neural network learning device according to claim 3, wherein,
   as the pattern recognition processing, the neural network performs face recognition processing, object recognition processing, or voice recognition processing.

5. A neural network learning method comprising:
   by an information processing device which has at least one memory storing a computer program and at least one processor configured to execute the computer program,
   determining a size of a local region in learning information for each of a plurality of hierarchical layers, based on a structure of a neural network, the local region being targeted for learning by the neural network including the hierarchical layers;
   controlling in such a way as to repeat extracting the local region from the learning information, based on the size of the local region which is determined, and learning, by the neural network, the learning information being represented by the local region being extracted, while changing the size of the local region being extracted from the learning information, and
   determining the size of the local region for a first hierarchical layer of the hierarchical layers in such a way as to satisfy being equal to or more than a minimum value of the size of the local region at which a learning effect related to the first hierarchical layer is expected, and being less than a minimum value of the size of the local region at which a learning effect in a second hierarchical layer of the hierarchical layers being located at a stage next to the first hierarchical layer is expected.

6. The neural network learning method according to claim 5, further comprising:

determining the size of the local region, based on a size of a filter related to the hierarchical layer which performs a convolutional calculation by the filter.

7. A non-transitory computer-readable recording medium storing a neural network learning program which causes a computer to execute:

determination processing of determining a size of a local region in learning information for each of a plurality of hierarchical layers, based on a structure of a neural network, the local region being targeted for learning by the neural network including the hierarchical layers; and control processing of controlling in such a way as to repeat extracting the local region from the learning information, based on the size of the local region which is determined by the determination processing, and learning, by the neural network, the learning information being represented by the local region being extracted, while changing the size of the local region being extracted from the learning information; wherein the determination processing determines the size of the local region for a first hierarchical layer of the hierarchical layers in such a way as to satisfy being equal to or more than a minimum value of the size of the local region at which a learning effect related to the first hierarchical layer is expected, and being less than a minimum value of the size of the local region at which a learning effect in a second hierarchical layer of the hierarchical layers being located at a stage next to the first hierarchical layer is expected.

* * * * *